C. A. JOHNSON.
BALE TYING MECHANISM.
APPLICATION FILED MAY 3, 1910.

969,284.

Patented Sept. 6, 1910.

4 SHEETS—SHEET 1.

Witnesses

Carl A. Johnson,
Inventor
by C. A. Snow & Co.
Attorneys

C. A. JOHNSON.
BALE TYING MECHANISM.
APPLICATION FILED MAY 3, 1910.

969,284.

Patented Sept. 6, 1910.
4 SHEETS—SHEET 2.

Witnesses

Carl A. Johnson, Inventor by C. A. Snow & Co.
Attorneys

C. A. JOHNSON.
BALE TYING MECHANISM.
APPLICATION FILED MAY 3, 1910.
969,284.
Patented Sept. 6, 1910.
4 SHEETS—SHEET 3.
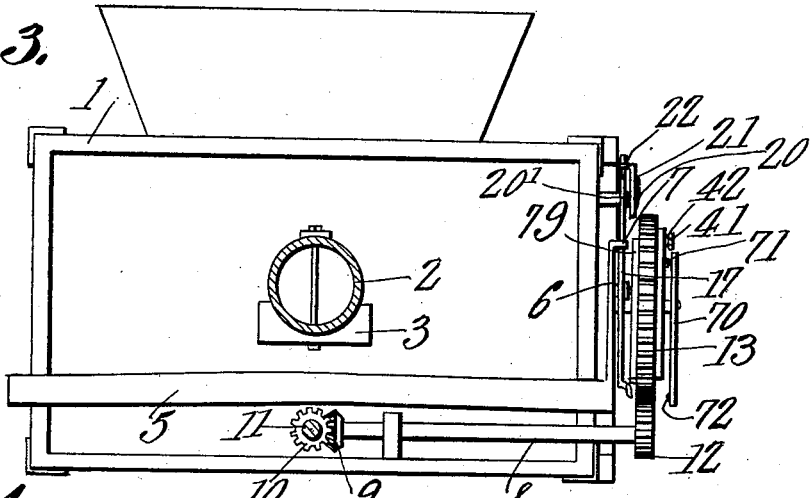
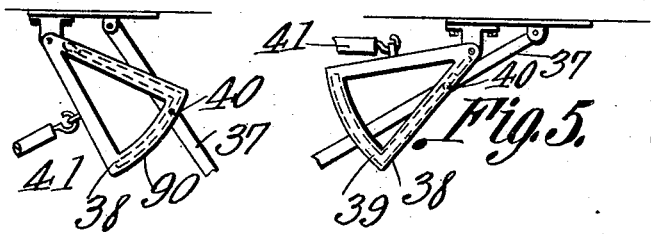
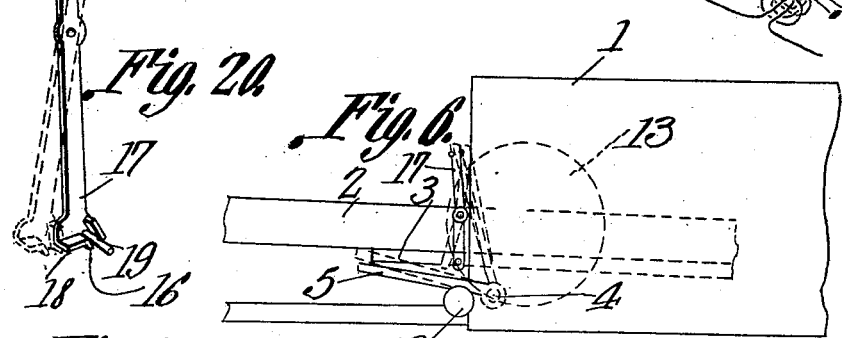
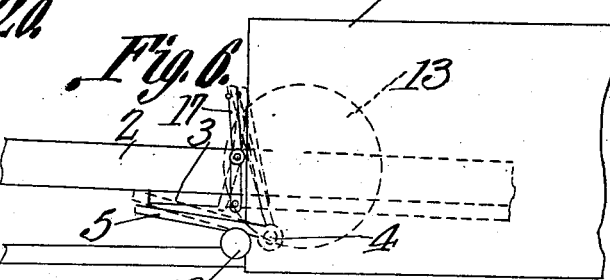
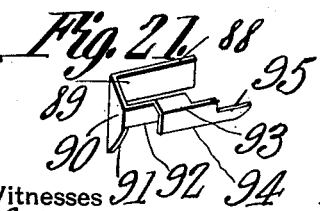
Witnesses
Carl A. Johnson,
Inventor
by C.A.Snow & Co.
Attorneys

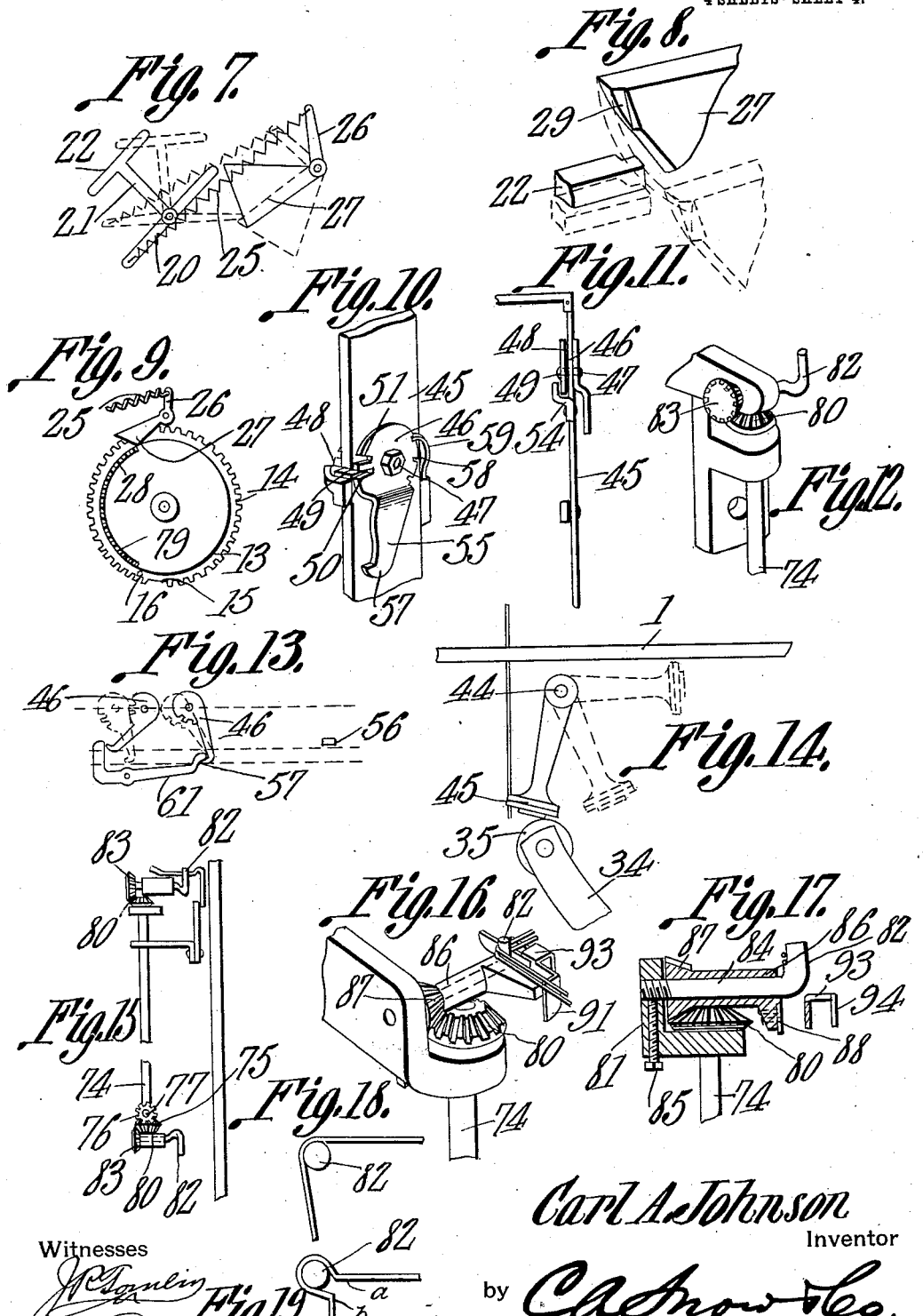

UNITED STATES PATENT OFFICE.

CARL A. JOHNSON, OF BUCKLIN, MISSOURI.

BALE-TYING MECHANISM.

969,284.  Specification of Letters Patent.  Patented Sept. 6, 1910.

Application filed May 3, 1910. Serial No. 559,080.

*To all whom it may concern:*

Be it known that I, CARL A. JOHNSON, a citizen of the United States, residing at Bucklin, in the county of Linn and State of Missouri, have invented a new and useful Bale-Tying Mechanism, of which the following is a specification.

This invention relates to a bale tying mechanism and consists in the novel construction and arrangement of its parts as hereinafter shown and described.

The object of the invention is to provide a tying mechanism especially adapted to be used in combination with baling presses and the like for quickly and effectually tying a wire band about the bale and means for operating the bale tying mechanism which may be manually thrown into gear or operative connection with the source of power that operates the press and which is automatically thrown out of gear with the said source of power when the bale tie is completed and the parts assume their normal positions.

With the above object in view the structure includes means for holding the plunger at a state of rest in the vicinity of the completion of its compression stroke during the time that the band tying operation is in progress and means for holding the ends of the tie wire during the time that the band is being knotted, means for forming the knot, means for stripping the knot from the knotter, means for actuating needles of peculiar configuration and an operating means for connecting all of the other said means with the source of power that operates the baling press.

Figure 1:
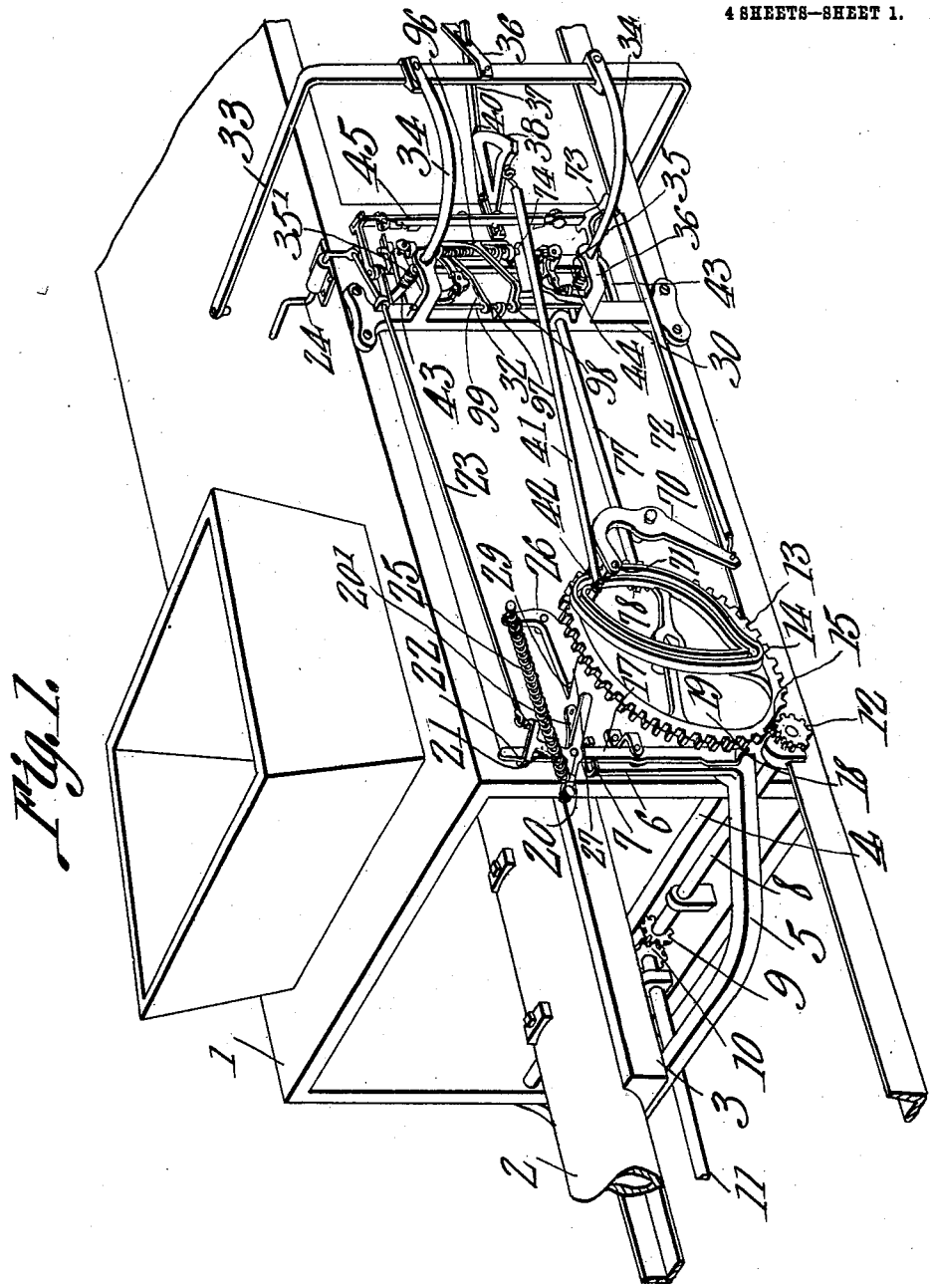
Figure 2:
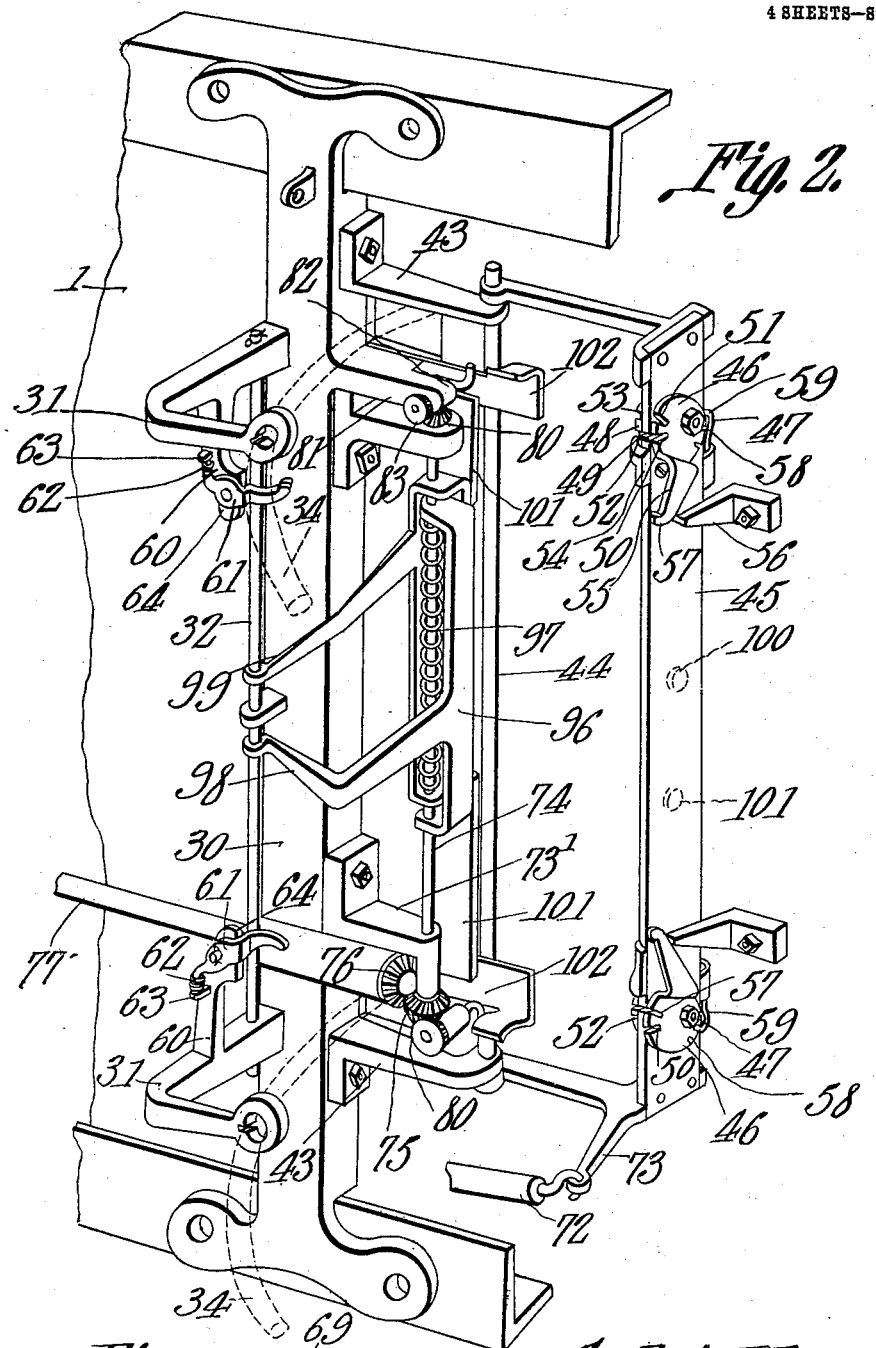
Figure 24:
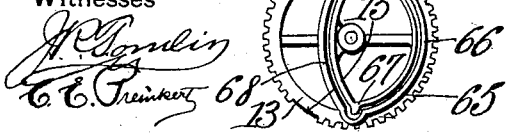

In the accompanying drawings:—Figure 1 is a perspective view of the bale tying mechanism applied to a baling box. Fig. 2 is an enlarged perspective view of a portion of the bale tying mechanism. Fig. 3 is an end view of the baling box showing portions of the bale tying mechanism attached thereto. Figs. 4 and 5 are views showing different positions of a sector employed for operating a needle frame forming a portion of the tying mechanism. Fig. 6 is a diagrammatic view of parts of the tying mechanism which hold the baling plunger at a state of rest during the bale tying operation. Fig. 7 is a diagrammatic view of mechanism which may be manually operated to effect the arrest of the baling plunger. Fig. 8 is a perspective view of adjacent portions of the parts of the mechanism illustrated in Fig. 7. Fig. 9 is a side elevation of a master wheel forming a portion of the bale tying mechanism. Fig. 10 is a perspective view of a wire cutting and holding device forming a portion of the mechanism. Fig. 11 is an edge elevation of the said wire cutting and holding device. Fig. 12 is a perspective view of means for rotating a rotatable knotter bill. Fig. 13 is a diagrammatic view showing the different positions that the wire cutter may assume during the cutting and holding operation. Fig. 14 is a top plan view of the wire cutter and holder indicating the various positions that the frame may assume in dotted lines. Fig. 15 is a side elevation of a knotter showing a stripper in relative position with respect to the same. Fig. 16 is a perspective view of a knotting mechanism in which a fixed knotter bill is employed. Fig. 17 is a sectional view of the mechanism shown in Fig. 16. Fig. 18 is an end view of a knotter bill showing the wire in position about the same prior to the initial step in tying the knot. Fig. 19 is an end view of the knotter bill showing the position of the wire about the frame during one of the intermediate steps of the process of forming the knot. Fig. 20 is a perspective view of the master wheel releasing lever. Fig. 21 is a perspective view of a knot forming plate adapted to be used in conjunction with the fixed knotter bill. Fig. 21ª is a side elevation of said knot forming plate. Fig. 22 is a side elevation of the knot as formed in the bale tie. Fig. 23 is a perspective view of the same. Fig. 24 is a side elevation viewing the inner side of the master wheel.

As illustrated in the accompanying drawings, the numeral 1 designates a press box in which a plunger bar 2 is mounted for reciprocation in the usual manner. A block 3 is fixed to the under side of the plunger bar 2 and is adapted to be engaged by a yoke (to be described presently) for the purpose of holding the said plunger bar 2 in the vicinity of the extremity of the compression stroke of the plunger. A shaft 4 is pivoted at one end of the baling box 1 and the ends of a yoke 5 are connected with the ends of the said shaft 4. The intermediate portion of the yoke 5 lies under the block 3 but at the completion of the compression stroke of the plunger the outer end of the block 3 has passed between the outer portion of the yoke 5 and the adjacent end of the baling box 1. A standard 6 is fixed to one end of the yoke 5 and is provided at its upper end with spaced stops 7.

A shaft 8 is journaled for rotation at the end of the baling box 1 and is provided at its inner end with a beveled pinion 9 which meshes with a beveled pinion 10 upon a shaft 11. Any suitable means may be provided for rotating the shaft 11. A relatively small gear wheel 12 is fixed to the outer end of the shaft 8.

A master wheel 13 is journaled for rotation at the side of the baling box 1 and is provided upon its periphery with a series of gear teeth 14 which series is interrupted by a blank space 15 which normally receives the peripheral portion of the gear wheel 12. The shaft 11 is maintained in a constant state of rotation and therefore the shaft 8 is also rotated constantly and inasmuch as the gear wheel 12 is normally in the blank space 15 provided at the periphery of the master wheel 13 during the major portion of the time the said master wheel remains in a state of rest. It is during the time that the said master wheel is at rest that the formation of the bale in the baling box 1 is in progression. The master wheel 13 is provided upon its inner side with a pin 16. A lever 17 is fulcrumed upon the side of the baling box 1 and its upper portion lies between the spaced stops 7 carried at the upper end of the standard 6. The lever 17 is provided at its lower end with a flange 18 upon which the pin 16 normally rests and by means of which the master wheel 13 is restrained against rotation. A downwardly inclined lug 19 is also carried at the lower end of lever 17 and the said lug is spaced at its lower side from the inner edge of the flange 18. The space between the inner edge of the flange 18 and the lug 19 is sufficient to permit the pin 16 carried by the master wheel 13 to pass between the said parts when the lever 17 is swung in a manner hereinafter to be explained.

An arm 20 is pivoted to a casting 20′ attached to the wall of the baler and is provided with a laterally disposed arm 21 which at its upper end carries spaced stops 22. The stops 22 receive between them the upper end portion of the lever 17. A cable or draft rod 23 is pivotally connected at one end with one of the stops 22 and at its other end is connected with the crank of a treadle mechanism 24 mounted upon the baling box 1. One end of a traction spring 25 is connected with one end of the arm 20 at the opposite side of the pivot upon which the said arm 20 is supported from that side at which the draft connection 23 connects with the lug 22. The other end of the traction spring 25 is connected with the upper end of a push member 26 which in turn is pivoted to the side of the baling box 1. The push member 26 is provided with a chamfered end 27 which normally lies against the end of an arcuate flange 28 provided upon the inner side of the master wheel 13. The end portion of the push member 26 adjacent the end of the arm 20 is notched out as at 29 in order to permit the said arm 20 to pass the said push member 26 without interfering with the same when the said parts are in motion.

During the process of forming the bale the traction spring 25 is below the pivotal connection between the arm 20 and the casting 20′ as indicated in full lines in Fig. 7. However when the bale arrives at completion an operator steps upon the inner portion of the treadle 24 and turns the same whereby the draft means 23 is moved longitudinally and the more remote lug 22 is swung over against the edge of the lever 17 in the manner as illustrated in Fig. 1 of the drawing, and the said lever is swung and the flange 18 is moved from under the pin 16. At the same time the traction spring 25 is moved from its position below the pivotal connection between the arm 20 and the casting 20′ to a position above the said pivotal connection as shown in Fig. 1. The spring 25 while in this elevated position pulls upon the far end of the member 26 and turns the said member upon the pivot and forces the chamfered end 27 thereof against and along the end of the flange 28 upon the inner side of the wheel 13. Thus the said wheel 13 is started in its counter clockwise turning movement and the initial tooth of the series of gear teeth 14 is moved into engagement with the teeth upon the gear wheel 12. As the gear wheel 12 is in a constant state of rotation, rotary movement is transmitted to the wheel 13 which completes one revolution. When the flange 28 passes beyond the end of the member 26, the said member (still under the tension of the spring 25 in its elevated position) is swung still farther in a downward direction and by means of the notch 29, through which the adjacent end of the arm 20 passes, the end of the member passes below the adjacent end of the arm 20 and the parts assume the relative positions as illustrated in dotted lines in Fig. 7. When the member rides upon the flange 28, the end of the said member engages the adjacent end of the arm 20 and swings the same into the position shown in solid lines in Fig. 7 and the spring 25 moves below the pivot of the arm 20. In the meantime the intermediate portion of the yoke 5 has been elevated by reason of the fact that the shaft 4 is turned under the tension of the spring 25 and when the block 3 arrives at the extremity of the compression stroke the intermediate portion of the said yoke 5 moves up above the plane of the lower edge of said block and as the plunger bar 2 attempts to retract the block 3 comes in contact with the intermediate portion of the yoke 5 and thus the block and its attachments are arrested or interrupted in their reciprocatory movement. When the master wheel 13 arrives at the completion of its rotation the lever 17 is swung back to its normal position and engages the other lug 7 at the upper end of the standard 6 and when the power is applied to the plunger bar 2 at the completion of the compression stroke and the said plunger bar is moved slightly forward the intermediate portion of the yoke 5 is swung down out of the path of the movement of the block 3 and consequently the plunger bar 2 is free to retract. This releasing of the plunger bar occurs after the knot has been formed in the bale tie and the said knot has been stripped from the knotting device.

A bar 30 is attached to the side of the baling box 1 and is provided with guide arms 31. A guide arm 32 is connected at its ends with the arms 31. A needle frame 33 is pivoted to the upper and lower sides of the baling box 1 and is provided with curved needles 34 which pass through the guide arms 31. Each needle 34 is provided at its end with a wire engaging roller 35 but as the said rollers form no part of the present invention it is thought that further description thereof is not necessary. The needles 34 are so arranged that when the frame 33 is swung as will be hereinafter explained the needles 34 are projected through the arms 31 across the baling box 1 and engage the wire at the opposite sides thereof and draw the same back across the baling box 1 to the tying mechanism. Coil springs 35' surround the needles 34 and are interposed between the arms 31 and the wire rollers 35 and are adapted to hold the end portions of the wires upon the said rollers when the needles are in retracted positions. The needle frame 33 is provided at an intermediate point with a slotted arm 36 in which is slidably mounted the outer portion of a lever 37. The lever 37 is fulcrumed to the side of the baling box 1. A sector shaped member 38 is pivoted to the side of the baling box 1 and is provided with a groove 39 which receives a pin 40 mounted upon the intermediate portion of the lever 37. The groove 39 in the sector member 38 is not straight but is provided or composed of angularly disposed end portions. A pitman rod 41 is pivotally connected at its rear end with the outer portion of the sector 38 and at its forward end is pivoted to a wrist pin 42 mounted upon the outer side of the master wheel 13. Therefore it will be seen that when the master wheel makes one rotation the pitman 41 will be moved longitudinally and when the sector 38 is swung so that the pin 40 is in the rear outermost portion of the groove 39 the lever 37 will be swung upon its fulcrum and through the said lever 37 and the arm 36 the needle frame 33 will be swung so that the needles 34 will be carried across the baling box 1 and back again across to their normal positions. During the movement of the needles across the baling box they will engage the wires as above stated. When the lever 37 is swung back against the side of the baling box 1 and the needles 34 are drawn to their retracted positions the pin 40 upon the said lever enters that portion of the groove 39 which is at the outer end of the sector 38 and consequently any further movement upon the part of the rod 41 does not affect the lever 37 as the said pin is free to move along the outer portion of the groove 39.

Arms 43 are secured to the bar 30 and carry a connecting rod 44 which is journaled therein. The ends of the connecting rod 44 project above the upper and lower sides of the said arms 43 and a frame 45 is fixed at its end portions to the projecting end portions of the said rod 44. Wire holding and cutting devices are located at the upper and lower portions of the frame 45 and as the said holding and cutting devices are of the same pattern a description of one will answer for both. Each holding and cutting device consists of a disk 46 fixed to a shaft 47 and located upon the outer surface of the intermediate portion of the frame 45 and a disk 48 fixed to the inner end of the shaft 47 and located beyond the inner surface of the intermediate portion of the frame 45. The intermediate portion of the frame 45 is provided with a notch 49 which is located between the disk 46 and disk 48. The disk 46 is provided with notches 50 and 51 and the disk 48 is provided with notches 52 and 53. A clamping plate 54 is attached to the intermediate portion of the frame 45 and has a portion which extends along the inner side of the disk 48. The disk 46 is provided with a peripheral projection 55 which at times is adapted to encounter a stop 56 fixed to the side of the baling box 1. The projection 55 terminates in an angularly disposed extremity 57 and is adapted to engage a pivoted stop to be described hereinafter. The disk 46 is provided at its edge opposite the edge thereof at which the notches 50 and 51 are located with indentations 58 which are adapted to be entered by the end of a spring 59 fixed to the edge of the intermediate portion of the frame 45.

When the projection 55 of the disk 46 comes in contact with the end of the stop 56 the disk is turned with the shaft 47 so that the notch 50 is brought into register with the notch 49 in the intermediate portion of the frame 45 and at the same time the notch 52 of the disk 48 is brought into register with the said notch 49. At the same time the end of the spring 59 enters one of the indentations 58 and the parts are held in this relation. That is to say all of the notches are alined and they receive a wire. A bracket 60 is carried by the arm 31 and a pivoted stop 61 is on the said bracket 60. A spring 62 is interposed between one end of the stop 61 and a lug 63 carried by the bracket 61 and the said spring is under tension with a tendency to hold the other end of the stop 62 in an elevated position. The bracket 60 is provided with a holder or an abutment 64 which is located immediately behind the free end of the pivoted stop 61.

The following is a brief description of the coöperation of the wire holding and cutting devices and the various stops. Presuming that the parts are in the positions as illustrated in Fig. 2 of the drawings and the frame 45 is swung toward the bracket 60 it will be seen that the notches 50, 49 and 52 are in alinement and that the hooked extremity 57 has been swung by reason of contact between the projection 55 and the stop 56 to an elevated position. The hooked extremity 57 passes over the free end of the stop 61 and comes in contact with the abutment 64 and at the same time a strand of wire passes from the needle roller 35 into the notches 50, 49 and 52. When the hooked extremity 57 strikes the abutment 64 the projection 55 together with the disk 46 is turned upon the shaft 47 and the said wire is cut at the inner edge of the disk 46 and the disk 48 rotates so that an un-notched portion of its periphery is brought into register with the notch 49 in the intermediate portion of the frame 45 and thus the end of the wire is bent down between the inner side of the disk 48 and the inner side of the plate 54. Thus the end of the wire is secured. The intermediate portion of the frame 45 then swings away from the brackets 60 until the secured end of the wire is moved beyond the path of the needle. But when the hooked extremity 57 of the projection 59 passes away from the bracket 60 it comes in contact with the free end portion of the stop 61 and presses the same down against the tension of the spring 62, and when the hooked extremity 57 has passed beyond the free end of the pivoted stop 61 the free end of the said stop is elevated under the tension of the spring 62 in the path of movement of the hook 59 at the extremity of the projecting portion 55 of the disk 46. At the time that the hooked extremity 57 engages the shoulder or abutment 64 of the bracket 60 the notches 51 and 53 of the disk 46 and 48 respectively are brought into register with the notch 49 in the intermediate portion of the said frame 45. Therefore when the frame 45 is again moved toward the bracket 60 the alined notches receive the other end portion of the wire and the hooked extremity 57 of the projection 55 encounters the free end of the stop 61 and the said disks 46 and 48 are further turned, cutting the wire as above indicated and securing the other end thereof. While the ends of the wire are thus secured the intermediate portion of the frame 45 is swung away from the bracket 60 and as they approach the stop 56 the wire is tied as will be explained hereinafter and when the ends of the projections 55 come into contact with said stops 56 the disks 46 and 48 are swung back into the position shown in Fig. 2 of the drawings and the confined ends of the wire are released.

A cam groove 65 is located upon the outer side of the master wheel 13 and the said groove includes a concentric portion 66 which merges at one end into a relatively shallow outwardly disposed eccentric portion 67 which in turn merges into an eccentric portion 68 of much flatter curvature than the portion 66 and the said portion 68 merges into a comparatively deep outwardly disposed eccentric portion 69 which in turn merges into the concentric portion 66. A curved lever 70 is fulcrumed upon the side of the baling box and is provided at one end with a pin or pin roller 71 which is located in the cam groove 65. The other end of the lever 70 is connected by means of a longitudinally extensible rod 72 with an arm 73 attached to the frame 45. Thus it will be seen that as the master wheel 13 rotates and the pin 71 is in the concentric portion 66 of the cam groove 65 the lever 70 will not be swung upon its fulcrum but as soon as the pin 71 enters the relatively shallow eccentric portion 67 the upper end of the lever 70 will be swung toward the bar 30 and the rod 72 will be moved longitudinally in the opposite direction. This movement on the part of the said lever swings the frame 45 so that the wire securing devices will clutch the second strand of wire. When the pin 71 enters the eccentric portion 68 of the cam groove 65 the lever 70 is swung in the opposite direction from that above stated and the frame 45 is swung away from the bracket 60. During this time the ends of the wire are tied as will be explained. When the pin 71 enters the relatively deep eccentric portion 69 of the cam groove 65 the cutting and securing disks engage, cut and retain that portion of the wire held by the needle roller which lies nearest the bracket 60 and when the pin 71 moves into the upper portion of the concentric section 66 of the cam groove 65, the master wheel ceases to rotate and the frame 45 stops swinging, holding the wire securing devices adjacent the paths of the needles. The said wire securing devices are thus held while the bale is being formed and then devices secure one end of the bale band. Arms 73' are also fixed to the bar 30 and a shaft 74 is journaled for rotation in the said arms 73'. A beveled pinion 75 is fixed to the intermediate portion of the shaft 74 and meshes with a beveled pinion 76 which is fixed to a shaft 77 journaled for rotation at the side of the baling box 1. A beveled pinion 78 is fixed to the forward end of the shaft 77 and is located in the path of movement of a series of gear teeth 79 located upon the inner side of the master wheel 13. The series of teeth 79 is incomplete, that is to say they do not extend entirely around the said wheel but there are enough teeth in the series to rotate the shaft 77 the desired number of times when the said teeth come into engagement with the beveled pinion 78. This of course is done when the master wheel 13 describes its rotation and thus means is provided for transmitting rotary movement at intervals from the master wheel 13 to the shaft 74. Beveled pinions 80 are fixed to the ends of the shaft 74 and are adapted to operate knot tying mechanisms. As these mechanisms are of the same design or pattern a description of one will answer for both.

In one form the tying mechanism is provided with a fixed knotter bill while in another form the tying mechanism is provided with a rotating knotter bill. The form using the rotating knotter bill will be described first. This form is illustrated in Figs. 2 and 15 of the drawing and consists of an arm 81 secured to the bar 30 in which the shank portion of a bill 82 is journaled and which is provided with a beveled pinion 83 which meshes with the adjacent pinion 80. The parts are so arranged and timed that when the two ends of the wire constituting the bale band are drawn about the bill 82 as the frame 45 moves away from the bracket 60 to assume the position shown in Fig. 2 the shaft 74 is rotated and thus the knotter bills 82 are rotated and the ends of the wire are twisted about the extremity of the bill and at the same time the extremities of the wires are liberated at the disks 46 and 48.

The form of tying mechanism in which the bill is held stationary is illustrated in detail in Figs. 16 and 17. In this form the shank of the bill 84 is held in the arm 81 by means of a set screw 85 or other securing device. A sleeve 86 is journaled upon the shank portion of the bill 84 and is provided with a beveled pinion 87 which meshes with the pinion 80 at the end of the shaft 74. A twisting plate 88 is fixed to the other end of the sleeve 86 and is adapted to coöperate with the extremity of the bill 84 in forming a knot in the bale band. The twisting plate is illustrated in detail in the perspective view numbered 21. The said twisting plate 88 is provided with a flange portion 89 which is attached directly to the outer end of the sleeve 86 at one side of the extremity of the knotter bill 84. A portion 90 is merged with the portion 89 and the said portion 90 is provided with a chamfered lower edge 91. A portion 92 merges with the outer end of the portion 90 and is located beyond the outer side of the extremity of the knotter bill 84. A portion 93 extends outwardly from the upper edge of the portion 92 and a depending portion 94 extends parallel from the outer edge of the portion 93 with the portion 92. The portion 94 is provided with an edge 95 which is adapted to engage the end portions of the wire and slightly twist them about the extremity of the knotter bill 84, so that the wires are provided with kinks as indicated at $a$ in Fig. 19. As the twisting plate 88 passes around the extremity of the knotter bill 84 the wires are also provided with kinks as indicated at $b$ in Fig. 19 of the drawings and when the wires are thus positioned the ends are released from the securing devices and as the twisting plate 88 continues to rotate the portions having the kinks $b$ are twisted about the portions having the kinks $a$.

As the twisting plate rotates about the knotter bill 84 the wires are distorted from the positions as shown in Fig. 18 into the positions as shown in Fig. 19 largely by the portions 90 and the edge 91 of the said plate 88. The said chamfered edge of the said portion 90 engages the end portions of the wire and almost completes a loop about the extremity of the knotter bill 84 prior to the twisting of the ends of the wire upon themselves. After knots have been formed upon the knotter bills as indicated means must be provided for stripping the knots from the said bills. The following is a description of such means. Overlapping yokes 96 are slidably mounted upon the intermediate portion of the shaft 74 and a coil spring 97 is interposed between the opposite ends of the said yoke and is also located between the opposite ends of the same yoke. The spring 97 is under tension with a tendency to hold the yoke 96 overlapped to the farthest extent and each yoke 96 is provided with an arm 98 having an angularly disposed portion 99 lying in the path of movement of rollers 100 journaled upon the intermediate portion of the frame 45. The outer end of the arms 98 slidably receive the rod 32 above mentioned. As the arm sections 99 approach the rod 32 they converge toward each other. Consequently when the frame 45 is swung toward the bracket 60 and the rollers 100 come in contact with the edges of the arm sections 99 the said arms 98 are spread from each other and the yokes 96 are moved longitudinally along the shaft 74 against the tension of the spring 97. Plates 101 are attached to the yokes 96 and strippers 102 are carried by the said plates 101 and are adapted to operate adjacent the knotter bills and the knot tying mechanisms to remove the completed knot from the same.

Having described the invention what I claim as new and desire to secure by Letters Patent is:—

1. In combination with a baling press, a tying mechanism, a needle, means for operating the needle and tying mechanism, means for arresting the movement of the plunger of the press while the said operating means is in action consisting of a yoke, a spring catch mechanism for holding the yoke out of engagement with the operating parts of the press and a manually operable means for releasing said spring catch mechanism.

2. In combination with a baling press, a tying mechanism, a needle mechanism, a yoke adapted to interrupt the operation of the press, a spring catch mechanism for holding said yoke in an inactive position, means for manually releasing the spring catch mechanism, a master wheel operatively connected with the needle mechanism and the knot tying mechanism, said spring catch mechanism also connected with said master wheel to start the same in its initial operation.

3. In a bale tying mechanism, a knotting device, a frame arranged to swing about the knotting device, a needle arranged to coöperate with the knotting device, a band holding, cutting and releasing means carried by said frame and adapted to coöperate with the knotting device and stops located in the path of the said band holding, cutting and releasing means to actuate the same.

4. A bale tying mechanism comprising a knotting device, a needle arranged to coöperate with the knotting device, a frame arranged to swing about the knotting device, a band cutting, holding and releasing means carried by the frame, a fixed stop adapted to operate the said means when the frame is in one position, a pivoted spring actuated stop adapted to actuate the said means when the frame is at the extreme of its reverse position.

5. A knotting device comprising a knot tying means, a needle arranged to coöperate with the knot tying means, a frame arranged to swing about the knot tying means, a band cutting, holding and releasing means carried by the frame, a stop adapted to actuate said means when the frame is in one position, a bracket located in the path of movement of said frame, a spring actuated pivoted stop located upon said bracket and adapted to operate the band cutting holding and releasing means when the frame is in another position.

6. A bale tying mechanism comprising a knotting device, strippers adapted to coöperate with the knotting device, a needle mechanism adapted to coöperate with the knotting device, a frame arranged to swing about the knotting device and carrying means for cutting, holding and releasing a band, and means carried by said frame for actuating the stripping devices.

In testimony that I claim the foregoing as my own, I have hereto affixed my signature in the presence of two witnesses.

CARL A. JOHNSON.

Witnesses:
J. B. POUND,
WM. JOHNSON.